Aug. 21, 1945. J. B. PARSONS 2,383,154
FASTENING DEVICE
Filed Nov. 20, 1943
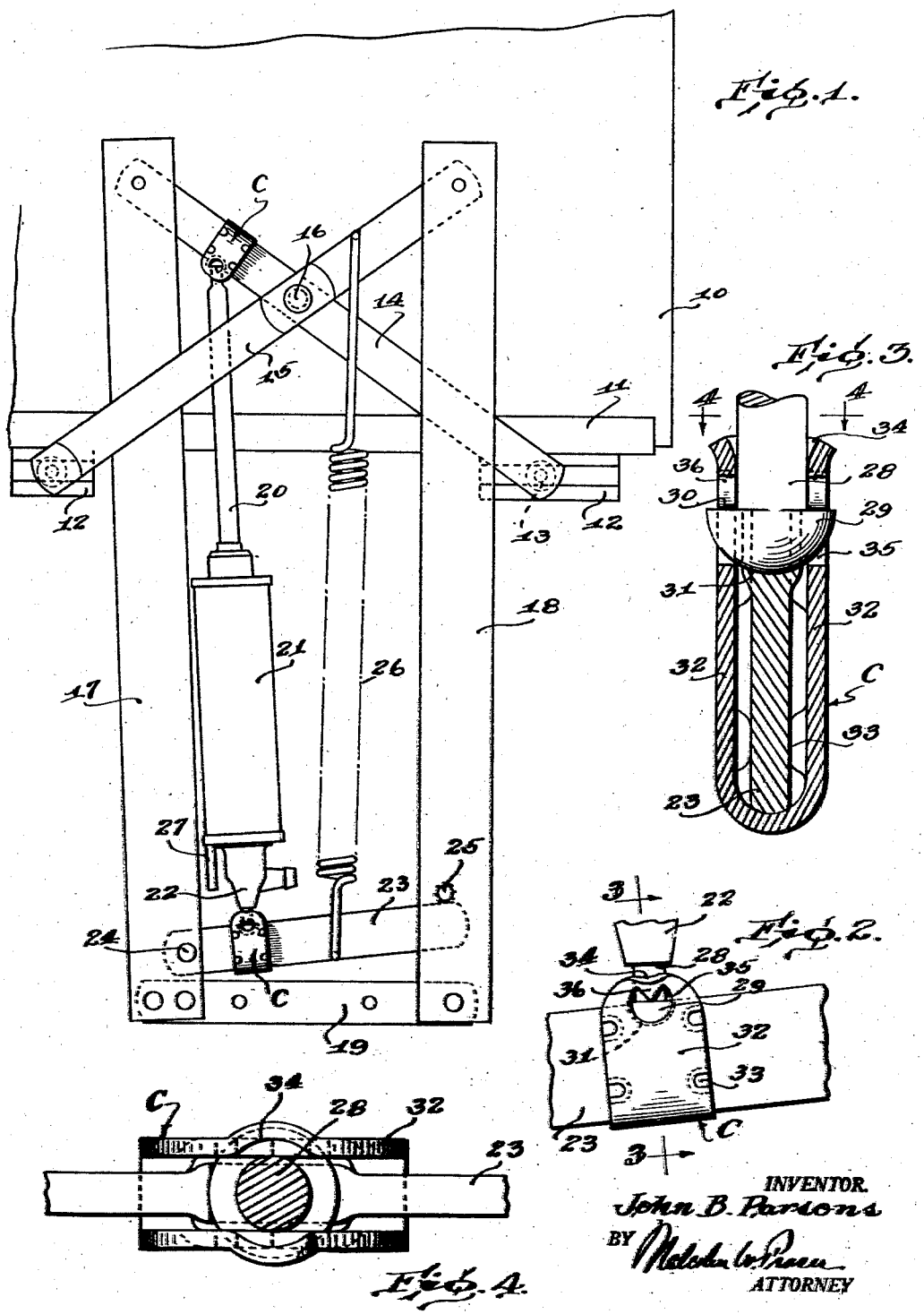
INVENTOR.
John B. Parsons
BY
ATTORNEY Patented Aug. 21, 1945

2,383,154

UNITED STATES PATENT OFFICE 2,383,154

FASTENING DEVICE

John B. Parsons, Toledo, Ohio

Application November 20, 1943, Serial No. 511,191

2 Claims. (Cl. 287—91)

This invention relates to fastening devices but more particularly to fasteners of sheet material used for connecting members together in such manner that one can rock relative to the other.

An object is to provide a new and improved fastener of the above character which can be readily applied to one part to be joined and securely engages the other part without employing separate fasteners for holding the two parts against accidental separation.

Another object is to produce a simple and efficient connection between two members by which one can rock relative to the other by employing a simple clip of sheet material which is adapted readily to be applied to one part for grippingly engaging the other part and inherently holding the two parts in assembled relation.

A further object is to produce an articulated connection between two parts by means of a sheet metal clip grippingly engaging one part and so designed as to engage the other part so that the latter can rock freely, the parts being capable thereby of being quickly and easily connected without use of special tools.

A still further object is to produce a fastener which can be manufactured inexpensively and readily applied to a pair of members to afford a detachable connection therebetween by which one member can freely swing relatively to the other.

A still further object is to produce a spring clip which is adapted frictionally to engage one part to be joined, the clip being designed to embrace a part having a semispherical end and hold it in place but enable free rocking motion of the last part relative to the other part.

Other objects and advantages of the invention will hereinafter appear, and, for purposes of illustration but not of limitation, an embodiment of the invention is shown on the accompanying drawing, in which Figure 1 is a side elevation of a hydraulically operated window regulator showing the fastener clip used in the connection therewith;

Figure 2 is an enlarged fragmentary side elevational showing the fastener connected in place;

Figure 3 is an enlarged vertical section on the line 3—3 of Figure 2; and

Figure 4 is a transverse sectional view on the line 4—4 of Figure 3.

The illustrated embodiment of the invention comprises a vehicle window panel 10, the lower edge of which is embraced by a channel 11 having the usual depending slotted retainers 12. Sliding horizontally in the retainer slots are studs or buttons 13, which are fixed respectively to the outer ends of regulator arms 14 and 15, the latter being pivotally connected by a rivet 16. The inner ends of the arms 14 and 15 are pivoted respectively to upright frame arms 17 and 18, which are connected at their lower ends to a cross bar 19, the latter being fixed at one end to the frame arm 17 and being pivoted at the other end to the frame arm 18.

The cross arms 14 and 15 are swung upwardly to raise the window panel 10 by a hydraulic device, which comprises a piston rod 20 provided with a piston reciprocably mounted in a cylinder 21. The cylinder 21 has an extension 22 at its lower end which is connected, as will be hereinafter described, to an arm 23, which is pivoted at 24 to the frame arm 17 and is limited so far as upward swinging movement is concerned, by a stop pin 25 on the frame arm 18. An helical coil spring 26 is hooked over the cross arm 15 at its upper end and the lower end is hooked over the under side of the arm 23. Suffice it to say that liquid under pressure is admitted to the cylinder 21 through a tube 27 for effecting upward movement of the window panel 10 and is trapped to hold the window in the desired position of adjustment. By permitting the liquid to flow from the cylinder, the window panel is lowered by means of the coil spring 26. For more detail description of the construction and operation of the regulator mechanism, reference is made to my copending application Serial No. 452,864, entitled "Regulator mechanism unit."

It is a desideratum to establish a connection between the piston rod 20 and cross arm 14 as well as between the cylinder extension 22 and arm 23, which affords pivotal movement between the parts but which is inexpensive both from the standpoint of manufacture and assembly. Since both connections are identical, description of one is deemed sufficient. Forming a part of the extension 22 is an annular rod 28 which has an enlarged knob or semispherical end portion 29. The diameter of the portion 29 is greater than that of the rod 28 so that an annular shoulder or ledge 30 is formed. The arm 23 is formed on its upper edge with a curved notch 31, which is shaped to receive the knob 29 so that the knob is seated in the notch for rocking movements.

Embracing the arm 23 is a U-shaped one-piece clip C preferably of relatively thin spring metal. The clip C has a pair of parallel closely spaced arms 32, which are formed adjacent their side edge portions with spacer embossures or detents 33 extending inwardly into snug frictional engagement with the adjacent side of the arm 23.

thereby spacing each of the clip arms 32 therefrom. The free upper ends of the clip arms 32 are outwardly flared or cupped at the central portion, as indicated at 34, to facilitate the insertion of the knob 29 between the arms of the clip in the assembly operation. Adjacent the upper end of each of the arms 32 and spaced inwardly from the free end in position adjacent to the flared portion 34 is a cut out or aperture 35 which is annular except for wedge shaped tongue 36, the point of which extends downwardly to engage the ledge or shoulder 30 of the knob. Manifestly the two tongues 36 by engaging the shoulder 30, hold the knob from upward movement or disengagement from the clip but at the same time enable the knob to rock or swivel during the operation of the regulator mechanism.

In practice, it will be apparent that the clip C is first forced upon the arm 23. Then by holding the clip from retrograde movement, the knob 29 is forced between the flared portions 34, which assist in guiding the knob, thereby flexing the arms 32 outwardly and until the knob seats in the notch or socket 31. The tongues 36 are so chosen that when in this position, their pointed ends impinge against the shoulder 30 to provide point contact enabling the knob 29 and associated parts to rock or swivel freely. In order to disconnect the parts, the knob 29 is forced laterally clear of the clip arms or by outwardly flexing the latter to free the knob.

From the above description, it will be apparent that I have produced an exceedingly simple and inexpensive fastener providing readily and conveniently a satisfactory swivel joint without the use of pins or rivets, thereby greatly reducing the time and labor involved in assembly operations. The field of use for this fastener is wide and it is to be understood that the above use is to be regarded merely by way of illustration. Numerous changes in details of construction, arrangement and operation may be effected without departing from the spirit of the invention especially as defined in the appended claims.

I claim:

1. A coupling between two structural elements, one of said elements having a substantially semi-spherical end portion, comprising a substantially U-shaped clip embracing a portion of the other of said elements, opposite side portions of said U-shaped clip having transversely aligned holes of substantially circular configuration receiving the semi-spherical end portion of said one element, at least one side of said U-shaped clip having integral means at the edge of the opening therein extending to and constituting a fulcrum for the chord of said semi-spherical end portion aforesaid, the engagement of said fulcrum with said semi-spherical portion being such as to preclude displacement of said semi-spherical end portion from said aligned holes.

2. A coupling between two structural elements, one of said elements having a substantially semi-spherical end portion and the other element having an arcuate notch to receive and form a seat for said semi-spherical end portion, said coupling comprising a substantially U-shaped clip embracing a portion of the other of said elements, opposite side portions of said U-shaped clip having transversely aligned holes of substantially circular configuration receiving the semi-spherical end portion of said one element, at least one side of said U-shaped clip having integral means at the edge of the opening therein extending to and constituting a fulcrum for the chord of said semi-spherical end portion aforesaid, the engagement of said fulcrum with said semi-spherical portion being such as to preclude displacement of said semi-spherical end portion from said aligned holes and to retain the spherical end portion in its seat.

JOHN B. PARSONS.